INVENTOR.
GEORGE G. GRIMMER
BY
Mellin and Hanscom
ATTORNEYS

Nov. 7, 1961 G. G. GRIMMER 3,007,492
FLUID FLOW SYSTEMS AND PILOT VALVES THEREFOR
Filed Nov. 17, 1958 7 Sheets-Sheet 3

FIG. 3

INVENTOR.
GEORGE G. GRIMMER
BY
Mellin and Hanscom
ATTORNEYS

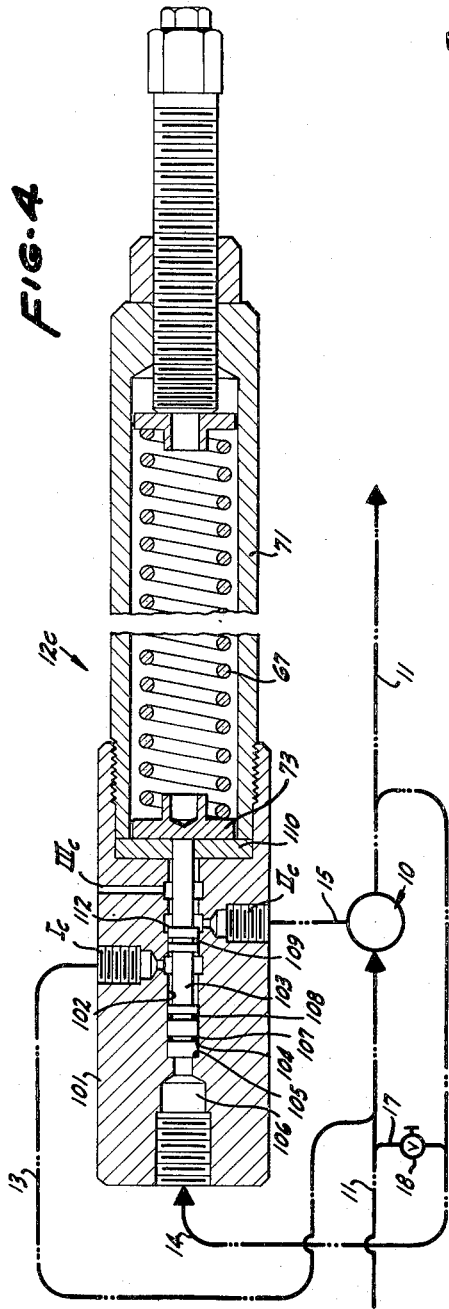

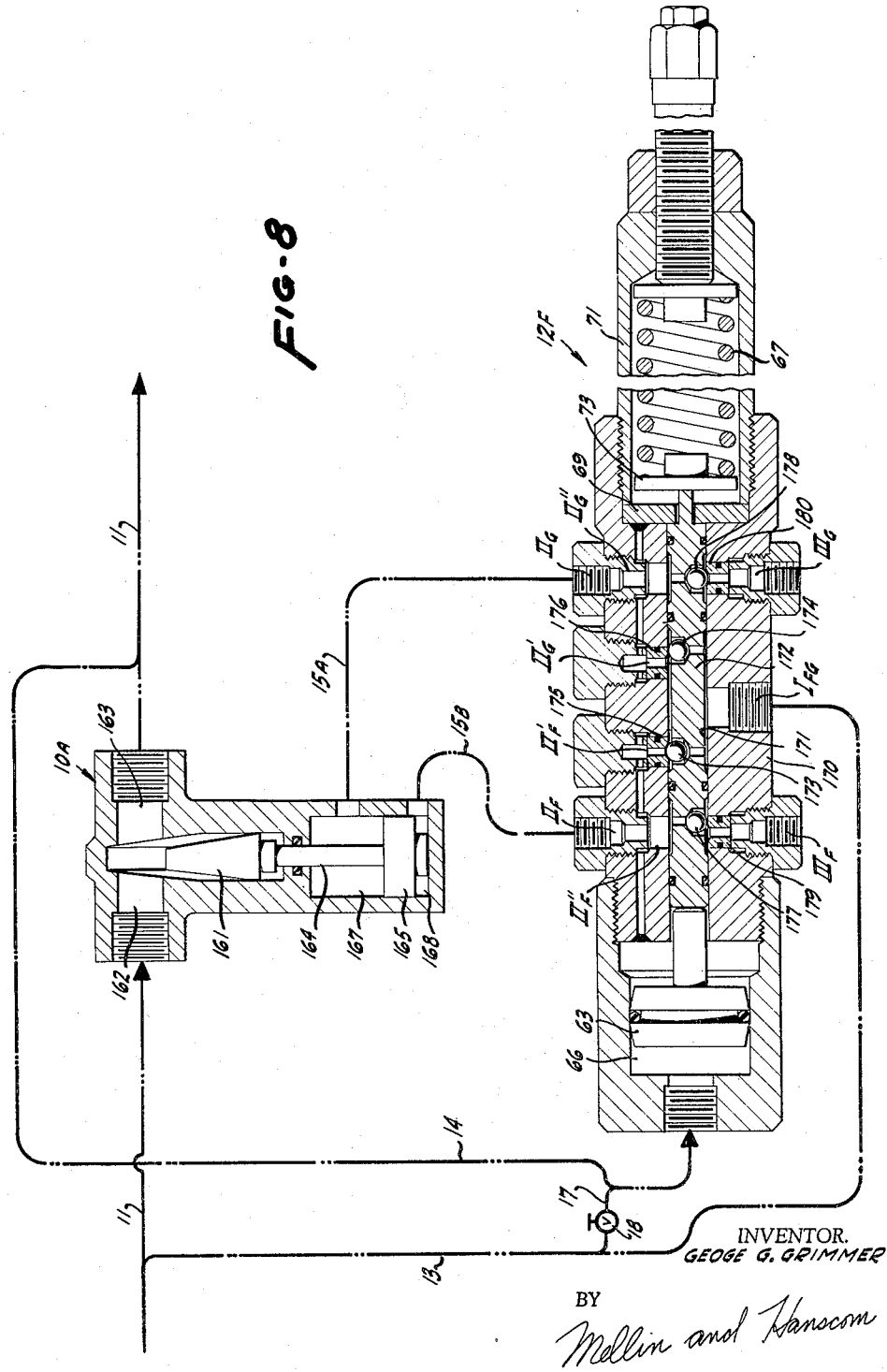

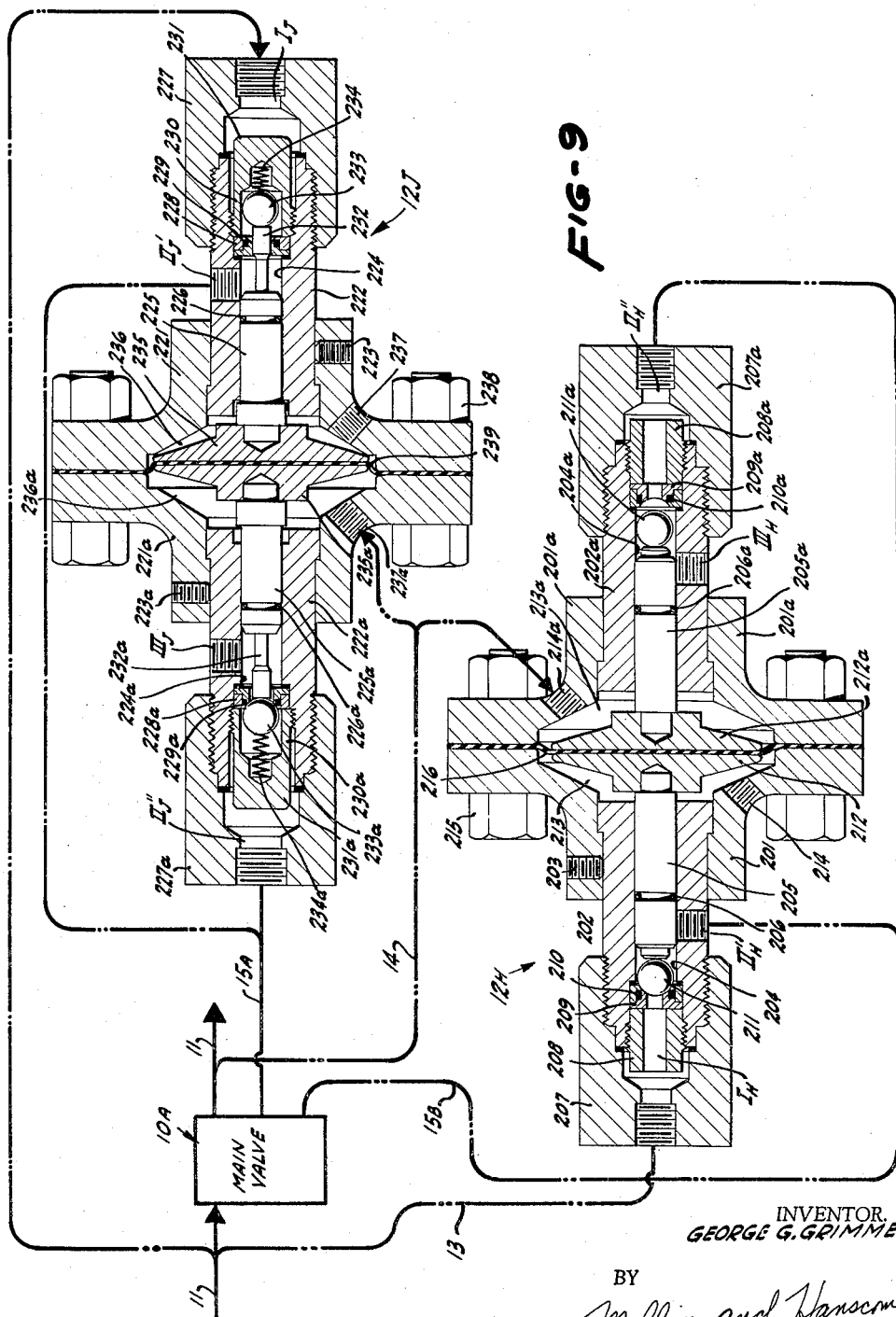

United States Patent Office 3,007,492
Patented Nov. 7, 1961

3,007,492
FLUID FLOW SYSTEMS AND PILOT VALVES THEREFOR
George G. Grimmer, Dallas, Tex., assignor to Otis Engineering Corporation, Dallas, Tex., a corporation of Texas
Filed Nov. 17, 1958, Ser. No. 774,510
9 Claims. (Cl. 137—620)

This invention relates to fluid flow systems and pilot valves therefor, and more particularly to such pilot valves which, due to a predetermined pressure change in the flow system, control the operation of a main valve device in the system.

Although this invention is disclosed herein with reference to oil and gas flow lines, it is not to be understood as limited to such use. It may be employed equally well wherever control is to be exercised in any manner as a function of a predetermined pressure change.

In the production of oil and gas a variety of situations can occur, making it imperative that the flow line leading from the well be closed automatically and without delay. Obvious situations are where the flow line is ruptured or where it is plugged. Some shut off valves for closing the flow line operate automatically, while others must be operated manually. Examples of the two are the Otis pressure responsive valve, patented under U.S. Patent No. 2,679,261 and the ordinary gate valve, respectively.

In some cases after the shut off valve has closed the flow line, it is desirable that the flow line be reopened automatically when the trouble which closed in the flow line has been corrected.

A primary object of this invention is to provide means which operates to control a device associated therewith as a function of a predetermined pressure change in the flow line in which the device is made up.

Another object is to provide such means which closes the shut off valve in the flow line as a function of a decrease in pressure in the flow line below a predetermined level.

Another object is to provide a valve such as specified in the preceding object which opens the shut off valve when the pressure in the flow line below the shut off valve is increased to a predetermined level.

Another object is to provide such means which closes a shut off valve in a flow line as a function of an increase in pressure in a flow line above a predetermined level.

Another object is to provide a valve such as specified in the preceding object which opens the shut off valve when the pressure in the flow line below the shut off valve is decreased to said predetermined level.

Another object is to provide a means which closes and reopens a shut off valve and flow line when the pressure in the flow line at a point therein downstream of the shut off valve exceeds or becomes less than preselected pressure range, and when said pressure reenters said range, respectively.

A further object is to provide such means which operates not only as a result of flow line pressure changes, but also as a result of changes in the magnitude of an external source of pressure or of solenoid excitations.

Other objects and advantages will become apparent in the course of the following detailed description.

In the drawings, forming a part of this application, and in which like parts are designated by like reference numerals throughout the same, FIG. 1 is a generally schematic illustration of a fluid flow system embodying the invention and showing the operating details of a pressure actuated main fluid flow valve.

FIG. 3 is similar to FIG. 2 and shows a sectional view of another pilot valve embodiment.

FIG. 4 is similar to FIG. 2 and discloses a sectional view of yet another pilot valve embodiment.

FIG. 5 is similar to FIG. 2, illustrating a sectional view of another modification of the pilot valve.

FIG. 6 is a sectional view of FIG. 5, taken on the line 5—5 thereof.

FIG. 8 shows schematically the fluid flow system of FIG. 1, illustrating the operating details of another form of main flow valve and showing a sectional view of another modification of the pilot valve used to control the operation of the main flow valve.

FIG. 9 is similar to FIG. 8, illustrating a sectional view of yet another form of the pilot valve.

Figure 1:
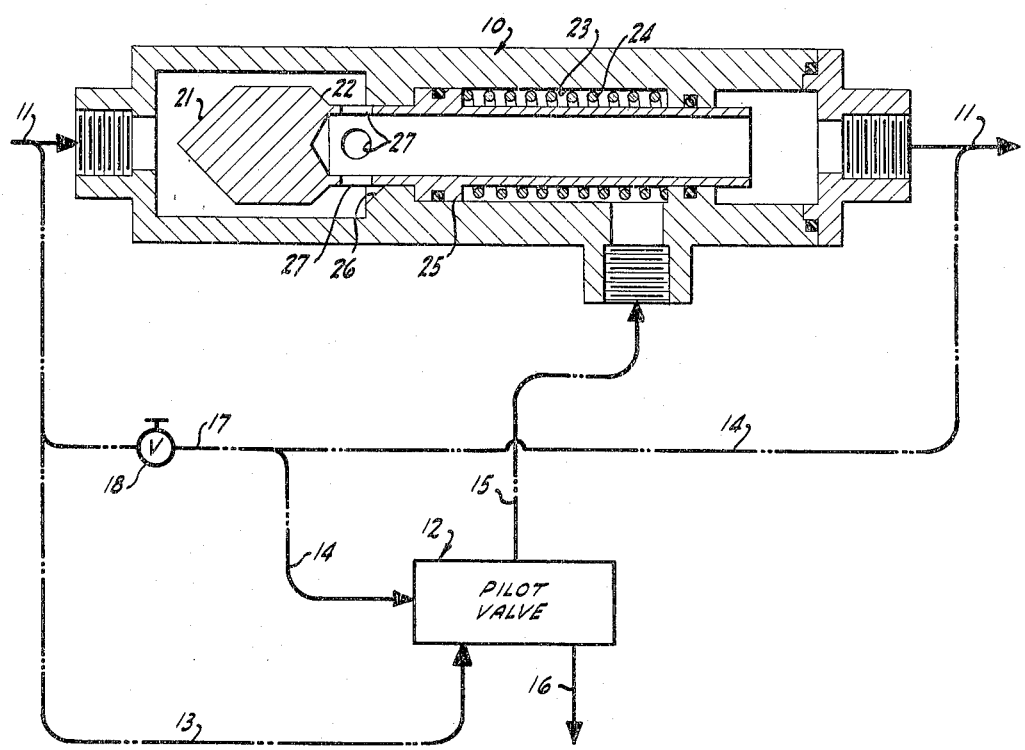

Referring now to the drawings and in particular to FIG. 1, a main fluid flow valve 10 is connected in a main fluid flow line 11. A pilot valve 12, the internal details of which will be described hereinafter in connection with FIGS. 2 through 9, is connected into the system by conduit 13 which connects to the main flow line 11 upstream of main valve 10. Conduit 14 connects the pilot valve to the main flow line downstream of the main valve. Conduit 15 connects the pilot valve to the pressure actuated valve operator of the main valve 10, and conduit 16 provides a vent from the pilot valve to atmosphere. A bypass conduit 17, with a manually operable valve 18 connected therein, communicates with the main flow line 11 upstream and downstream of the main flow valve 10, and is used to permit fluid flow to by-pass the main valve, when desired, for a purpose to be hereinafter described.

The main flow valve 10 may be any valve which is capable of opening when fluid pressure is applied to the valve operator thereof from the main flow line and which will close when such pressure is discontinued. Since only the general operating details of such a valve are important in the present invention, the main flow valve 10 has been illustrated only schematically in FIG. 1. The full constructional and operational details of the particular main valve illustrated may be found in the above mentioned Otis Patent No. 2,679,261.

The main valve 10 is provided with a longitudinally slidable valve member 21 having a valve face 22 thereon. When fluid pressure is applied to the piston chamber 23, such pressure (plus the force of spring 24) will act upon the piston head 25 causing the valve member to move to the left, or open, position (as shown) with the valve face 22 being unseated from the valve seat 26. Flow can now take place through the valve member ports 27 and passage 28 from the inlet to the outlet of the valve. If the piston chamber 23 is vented to atmosphere, the inlet fluid pressure will act upon the other side of the piston head 25 to move the valve member 21 to the right, seating the valve face 22 upon the valve seat 26 to interrupt flow through the valve.

In general, the pilot valve 12 has a valve operator therein responsive to the downstream pressure of the main flow line, supplied to the pilot valve 12 by conduit 14. When the downstream pressure is at a predetermined value, the pilot valve will connect the conduits 13 and 15 so that upstream pressure in the main flow line 11 will be applied to the piston chamber 23 of main valve 10 to maintain the valve element 21 therein in open position. In the event of a predetermined change in downstream pressure, the pilot valve 12 will connect conduits 15 and 16 to vent the piston chamber 23 of the main valve to atmosphere, allowing the main valve to close. When the downstream pressure again returns to its original value, the pilot valve will re-connect conduits 13 and 15, enabling the main valve to reopen. As will be seen, the control of the main valve 10 is accomplished automatically by the pilot valve 12 solely in response to predetermined pressure conditions in the main flow line 11 downstream of the main valve 10.

Figure 2:
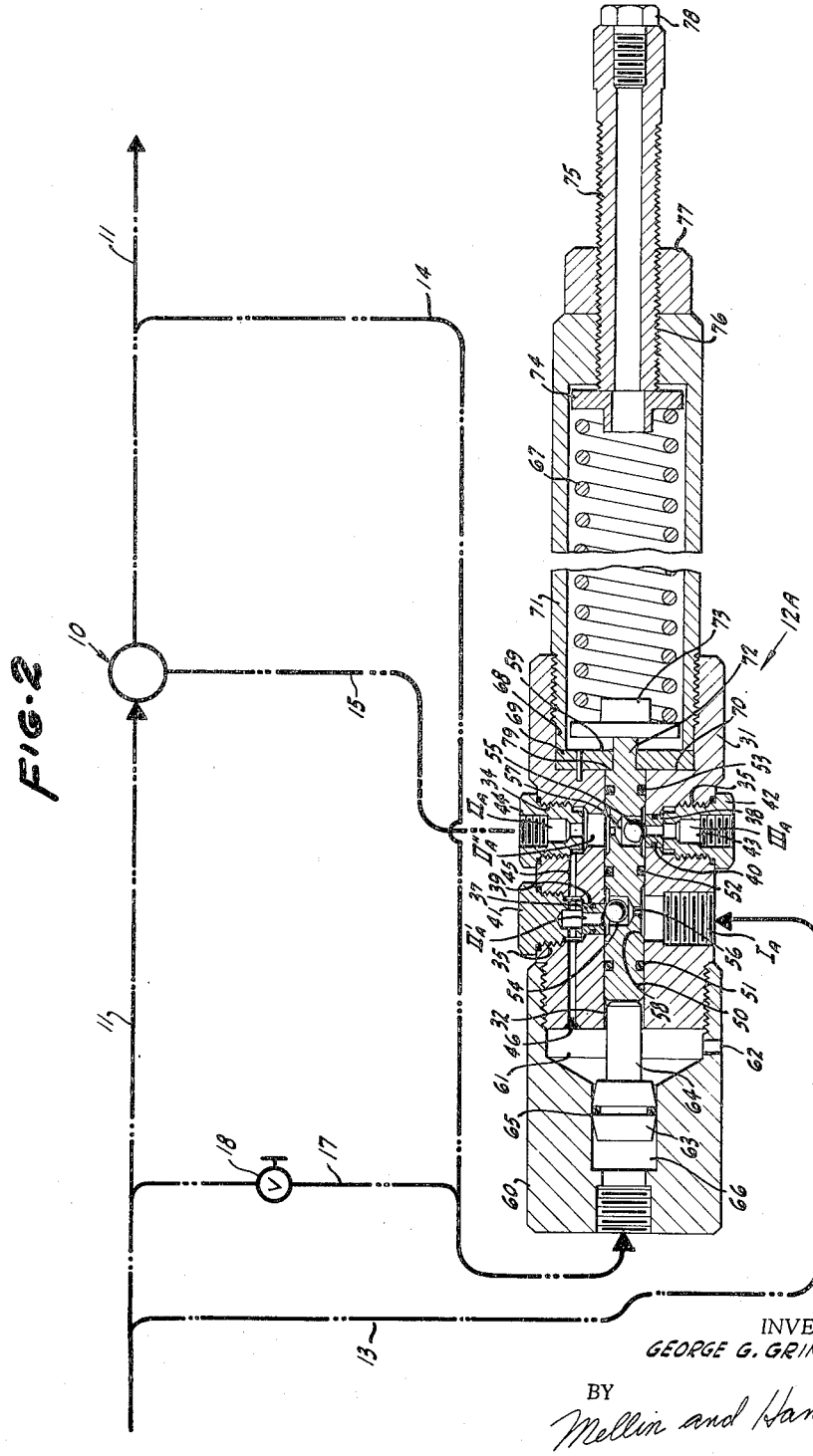
FIG. 2 illustrates the system of FIG. 1 and shows a sectional view of a pilot valve used to control the operation of the main fluid flow valve.

Referring now to the details of FIG. 2, the pilot valve 12A comprises a housing member 31 having a bore 32 therethrough which communicates its ends. Passages $I_A$, $II'_A$, $II''_A$ and $III_A$ are formed through the housing member, opening laterally into the bore 32 thereof. Identical plugs 37 and 38 are disposed in passages $II'_A$ and $III_A$, respectively, which have bores communicating these passages with bore 32. The interfaces of these passages and plugs 37 and 38 are sealed by O-rings 39 and 40. Plugs 37 and 38 are so positioned in the ports that they cannot and do not protrude into the bore 32. Plugs 37 and 38 are secured in the ports by caps 41 and 42 which are threadedly connected to housing member 31 and sealed thereto by O-rings. Cap 42 contains passageway 43 to provide communication from within bore 32 to the atmosphere. If desired, exhaust line 16 (FIG. 1) can be connected to cap 42.

Cap 44 is threadedly connected in passage $II''_A$ of the housing member and is sealed thereto by an O-ring. Conduit 15 is threadedly connected to cap 44 and leads to the piston chamber of the main valve 11 (FIG. 1). Passageway 45, sealed at 46, communicates with passages $II'_A$ and $II''_A$, thus providing a continuous fluid passage $II_A$ from bore 32 through passages $II'_A$ and $II''_A$ and then through conduit 15 to the main valve 10.

The upstream pressure conduit 13 is threadedly inserted in passage $I_A$ and, under certain conditions described more fully hereinbelow, can communicate with the passage $II'_A$.

A shuttle member 50 is slidably disposed in bore 32 for longitudinal movement therein, and the interface therebetween is sealed by O-rings 51, 52 and 53. Spherical ball valve members 54 and 55 are disposed freely in the enlarged pockets or portions of transverse passageways 56 and 57, respectively, in shuttle 50. These passageways communicate on opposite sides of the shuttle with annular grooves 58 and 59 formed in bore 32, respectively. With the shuttle in the position shown in FIG. 2, and the O-rings 51, 52 and 53 positioned as shown, ball 55 is positioned in the valve seat in plug 38 to plug passage $III_A$ when fluid is forced downwardly through passage $II''_A$ and passageway 57. When in this position, however, ball 54 abuts one side of plug 37 to leave passage $II'_A$ open when fluid is forced upwardly through passage $I_A$. Thus, a flow path from conduit 13 is provided through passageways $I_A$, 56 and $II_A$ and then through conduit 15 to the main valve 10.

Connector 60 is threadedly connected to the housing member 31 to form a chamber 61 which is maintained at atmospheric pressure by means of port 62. Enlarged piston head 63 of piston 64 is slidable in the connector, and the interface therebetween is sealed by O-ring 65. A variable capacity piston chamber 66 is thus formed in the connector and communicates with the downstream pressure conduit 14. The opposite end portion of the piston 64 extends freely into bore 32 and, due to the pressure in conduit 14 and the force exerted by spring 67 to be mentioned hereinbelow, maintains contact with the adjacent end of shuttle 50. Since such contact is always maintained, the piston 64 and shuttle 50 may be considered as a unitary member.

The end of housing member 31 opposite connector 60 has an enlarged bore 68, communicating with bore 32, in which plate 69 is disposed. The plate, having a central bore smaller than bore 32 and coaxial therewith, is maintained in abutment with shoulder 70 by spring housing 71 which is threadedly connected to the housing member and abuts the plate. Neck 72 of the shuttle extends through the plate bore and abuts spring stop 73 which is maintained thereagainst by spring 67.

A second spring stop 74, which abuts spring 67 and which can be forced toward spring stop 73 by rod 75 which threadedly engages spring housing 71 at 76 is used to vary the spring force. Rod 75's position in the spring housing can be varied by the threaded engagement, and a selected position therein can be secured by means of lock nut 77 which also threadedly engages the rod. Cap 78 may or may not be employed to close the bore of rod 75, as desired.

Thus it is seen that shuttle 50 can be forced to the right by pressure in conduit 14 and to the left by spring 67, that its displacement to the right is limited by engagement of shoulder 79 with plate 69, and that its displacement to the left is limited by engagement of spring stop 73 with plate 69.

In operation, pilot valve 12A is connected to the system as shown in FIGS. 1 and 2. To explain the operation of the pilot valve 12A, it is assumed that fluid is flowing through the main flow line 11, that the main valve 10 is open, that all parts of the pilot valve are in their relative positions as shown in FIG. 2, and that the force exerted by spring 67 has been set such that it will cause the pilot valve to close the main valve upon the occurrence of a predetermined decrease in fluid pressure downstream of the main valve.

Under these conditions, the force exerted by the fluid pressure acting through conduit 14 and on the piston head 63 is sufficient to maintain shuttle 50 in the position shown, in opposition to the force exerted by spring 67. Thus, the passageway from conduit 13 through the pilot valve and conduit 15 into the piston chamber 23 of the main valve 10 is open, since ball 54 cannot seal against the valve seat in passage $II'_A$, as previously explained; and the pressure upstream of the main valve 10 is the same pressure found in the main valve piston chamber 23, thus maintaining the main valve 10 in its open position. Also, as previously explained, under these conditions ball 55 seals against the valve seat in plug 38, thus preventing the loss of pressure from the main valve piston chamber 23 through conduit 15 and passage $III_A$ outwardly to atmosphere.

Should the pressure downstream of main valve 10 decrease sufficiently that the force exerted thereby on piston 63 is exceeded by the force exerted by spring 67, shuttle 50 will be forced to the left, causing ball 54 to seal the valve seat in plug 37 and ball 55 to be moved off the seat of plug 38, to uncover passageway 43. When this happens, the pressure in the main valve piston chamber 23 is vented to atmosphere through conduit 15, passageways $II''_A$, 57 and $III_A$; and the main valve 10 closes, as explained previously. When the difficulty downstream of the main valve is corrected and the pressure therebelow builds up sufficiently to overcome the force exerted by spring 67, shuttle 50 is again forced to the right and the upstream pressure, acting through conduit 13, the pilot valve 12A, and conduit 15 opens the main valve.

From the foregoing, it is seen that the pilot valve 12A operates to cause the main valve 10 to close only upon a decrease in pressure downstream of the main valve below a predetermined level. It does not cause the main valve to close when the pressure downstream thereof increases above any level. It is seen also that even though the pilot valve causes the main valve to close upon a decrease in pressure, it will permit the main valve to reopen automatically upon the elimination of the difficulty and the build up of pressure therebelow.

The by-pass line 17 has been provided so that the main valve 10 can be initially opened. The manually operable valve 18 is opened to allow flow through the by-pass line 17 and the conduit 14 into the piston chamber 66 of the pilot valve. The upstream pressure therein will then move the shuttle to the left, as illustrated, thus unseating the ball 54 and seating the ball 55, and the upstream pressure entering the pilot valve through conduit 13 can then cause the main valve 10 to open. The by-pass line 17 is now closed by valve 18 so that the pilot valve will respond solely to the downstream pressure applied through conduit 14.

It will be noted that the longitudinal spacing between the ball valves 54 and 55 is different from the longitudinal spacing between the valve seats in passages $II'_A$ and $III_A$ so that only one ball valve can be seated at any given time.

Referring now to FIG. 3, two pilot valves, 12A and 12B, are interconnected in a fluid flow system in such manner that they can be used to control the main valve 10 upon the occurrence of either a predetermined high pressure or a predetermined low pressure in the main flow line downstream of the main valve 10. That is, these pilot valves will operate to supply upstream pressure to the piston chamber 23 of the main valve whenever the downstream pressure is within a predetermined range. In the event that the downstream pressure increases or decreases to a value outside of this range, the pilot valves will cooperate to close the main valve. When the downstream pressure returns to within the desired range, the pilot valves will reopen the main valve 10.

The pilot valve 12A of FIG. 3 is identical to that illustrated in FIG. 2, with the pilot housing 31 having a first passage $I_A$ formed therethrough and opening laterally into the bore 32. A second passage $II_A$, formed through the pilot housing, has a first portion opening $II'_A$ laterally into the bore 32 in longitudinal proximity to the opening of passage $I_A$, and a second portion opening $II''_A$ laterally into the bore 32 at a point longitudinally spaced from the first opening thereof. A third passage $III_A$, formed through the housing member from atmosphere, opens laterally into the bore 32 in longitudinal proximity to the opening $II''_A$. Passages $II'_A$ and $III_A$ each have valve seats facing into the bore 32 upon which the ball valve members 54 and 55 may seat respectively. The pilot valve 12A of FIG. 3 operates in exactly the same manner as described in the description thereof in connection with FIG. 2.

The pilot valve 12B, of FIG. 3, is identical in structure to pilot valve 12A except for the location of the ball valve receiving pockets 56B and 57B formed in the shuttle member 50B. These pockets are formed in the shuttle member in such manner that when the shuttle member 50B is moved to the left by spring 67 (to the stopped position wherein spring stop 73 abuts plate 69), the ball valve member 55 is seated upon the seat formed at the opening of passage $III_B$ into bore 32, and the ball valve member 54 is to the left of the valve seat formed at the opening of passage portion $II''_B$ into bore 32.

The two pilot valves 12A and 12B are connected in the fluid flow system of FIG. 3 as follows. The downstream pressure conduit 14 is connected to both piston chambers 66 of the pilot valves. The upstream pressure conduit 13 is connected to passage $I_A$ of pilot valve 12A, and the passage $II_A$ thereof is connected by conduit 19 to passage $I_B$ of pilot valve 12B. Passage $II_B$ of pilot valve 12B is connected by conduit 15 to the main valve 10 so as to communicate with the piston chamber 23 thereof.

The pressure of spring 67 of valve 12A is set at a predetermined low value, and the pressure of spring 67 of valve 12B is set at a predetermined higher value.

In the operation of the system, it is assumed that the main valve 10 is open and that the downstream pressure (through conduit 14 to the pilot valves) is sufficiently high so that it overcomes the force of spring 67 in pilot valve 12A and moves the shuttle 50 therein to the right to the illustrated position, and is sufficiently low so that it does not overcome the force of spring 67 in pilot valve 12B so that the shuttle 50B is in the left position illustrated.

At this time, upstream pressure through conduit 13, passes through passages $I_A$ and $II'_A$ of valve 12A, conduit 19, passages $I_B$ and $II'_B$ of valve 12B, and conduit 15 to the main valve operator to maintain the main valve in open position. The passages $III_A$ and $III_B$ of valves 12A and 12B are closed by the ball valves 55.

In the event the downstream pressure in the main line 11 drops below the predetermined minimum, the spring 67 of pilot valve 12A will force the shuttle 50 therein to the left, as previously described. This will seat ball valve 54 on the valve seat in passage $II'_A$ and will unseat ball valve 55 from the valve seat in passage $III_A$, so that conduit 19 will be vented to atmosphere. Since the position of the shuttle 50B of valve 12B will be unmoved, the flow path therethrough will be unchanged, and the valve operator of the main valve 10 will be vented to atmosphere, allowing the main valve to close. When the downstream pressure in main line 11 again builds up to a value to overcome spring 67, the shuttle 50 will again move to the illustrated position and will reestablish communication from the upstream pressure conduit to the main valve, causing it to reopen.

In the event the downstream pressure increases, as from a blockage of the main line, the force in piston chamber 66 of valve 12B will overcome the force of the spring 67 thereof, and will cause the shuttle 50B to move to the right, enabling ball valve 54 to seat in passage $II'_B$ and to unseat ball valve 55 from passage $III_B$. This will interrupt the upstream pressure flow from conduit 19 through the valve, and will vent conduit 15 to atmosphere, thus allowing the main valve 10 to close. When the downstream pressure decreases below the maximum predetermined amount, the spring 67 will again move shuttle 50B to the left to reestablish the upstream pressure flow therethrough to the main valve 10, enabling that valve to reopen.

Thus it can be seen that the two pilot valves 12A and 12B cooperate to maintain the main valve 10 in open position whenever the downstream pressure is within the pressure range determined by the settings of the springs 67 in each valve. Whenever the downstream pressure falls below or rises above this range, the main valve will be closed, but will reopen when the downstream pressure again returns to within this predetermined range.

Referring now to FIG. 4, the pilot valve 12C is connected in the fluid flow system of FIG. 1, and is used to maintain the main valve 10 open whenever the downstream pressure is within a predetermined range and to cause the main valve to close whenever the downstream pressure is higher or lower than that range.

The pilot valve 12C comprises a housing member 101 having a longitudinal bore 102 therethrough in which a shuttle member 103 is slidably disposed for longitudinal movement therein. Movement of the shuttle member to the left is limited by the abutment of piston head 104 (formed on shuttle 102) with shoulder 105 of the bore. The portion of the bore to the left of the piston head forms a variable capacity piston chamber 106 which is connected to the downstream pressure conduit 14.

Three passages, $I_C$, $II_C$ and $III_C$, are formed through the housing member, and open laterally into annular grooves in the bore 102 thereof. The shutle member 103 has three longitudinally spaced O-rings 107, 108 and 109 therearound in sealing engagement with the bore 102.

The right end of the shuttle member 103 projects through the stop plate 110 and movement of the shuttle member to the right is limited by the engagement of the shuttle shoulder 112 with the stop plate.

A spring housing 71 (identical to that previously described in connection with pilot valve 12A) is connected into pilot housing 101 and contains a spring 67 and spring stop 73, the latter of which abuts the end of shuttle member 103.

The pilot valve 12C is connected in the fluid system with upstream pressure conduit 13 being connected to passage $I_C$ and conduit 15 being connected to passage $II_C$.

When the downstream pressure is below the force exerted by spring 67, the shuttle 103 will be moved to the extreme left position illustrated in FIG. 4. At this time, O-ring 109 will seal the bore 102 between passages $I_C$ and $II_C$ so that upstream pressure (through conduit 13) cannot pass to the operator of main valve 10, which operator is vented to atmosphere through conduit 15, passage $II_C$, bore 102, and passage $III_C$.

When the downstream pressure is sufficiently high, it will move the shuttle 103 to the right, against the bias of spring 67 to a position wherein the O-ring 109 will be between the passages $II_C$ and $III_C$ and the O-ring 108 will be to the left of passage $I_C$. At this time the upstream pressure can flow through conduit 13, passage $I_C$, bore 102, passage $II_C$ and conduit 15 to the main valve 10 to cause it to open.

If the downstream pressure continues to rise, the shuttle member will move further to the right, against the bias of spring 67 until the shuttle shoulder 112 abuts plate 10. At this time, the O-ring 109 will be to the right of passage $III_C$ and O-ring 108 will be between passages $I_C$ and $II_C$, so that the communication between passages $I_C$ and $II_C$ is interrupted and the communication between passages $II_C$ and $III_C$ is established. The main valve operator will now be vented to atmosphere and the main valve will close. O-ring 107 will be to the left of passage $I_C$ so that passage $I_C$ will be isolated from the piston chamber 106.

As the downstream pressure decreases, the shuttle 103 will be moved to the left by spring 67 and the above described valving operation will again occur, in the reverse order.

Thus, it is seen that there exists a pressure range, determined by the setting of the spring 67, in which the upstream pressure can flow through the pilot valve to the main valve operator to maintain the main valve in open position. If the downstream pressure is greater or less than this range, the main valve will close, and will reopen when the downstream pressure returns within the range.

The above described operation will occur when the pilot valve 12C is constructed as follows. The longitudinal distance between O-rings 108 and 109 must be less than the longitudinal distance between passages $I_C$ and $III_C$ and must be greater than the greatest longitudinal distance between either passages $I_C$ and $II_C$ or $II_C$ and $III_C$.

Referring now to FIGS. 5 and 6, the pilot valve 12D illustrated is designed to perform the same control function as described in connection with valve 12C.

The housing member 120 has a bore 121 therethrough of which the portion from shoulder 122 to the right is rectangular in cross section. A shuttle member 123 is slidably disposed in bore 121 for longitudinal movement therein, and the portion of the shuttle between shoulders 124 and 125 thereon is rectangular in cross section. The left end of shuttle 123 is formed with a piston head 126 and the portion of the bore to the left of piston head 126 forms a variable capacity piston chamber 127 which connects to the downstream pressure conduit 14. The right end of shuttle 103 projects through plate 128 to abut the spring stop 73.

Passages $I_D$ and $III_D$, longitudinally spaced from one another, open laterally into bore 121. Passage $II_D$ is also formed through the housing member 120 and has a first portion $II'_D$ opening into bore 121 in longitudinal proximity to passage $I_D$ and a second portion $II''_D$ opening into bore 121 in longitudinal proximity to passage $III_D$.

Passage $I_D$ is formed through the connector 129, threaded into the housing member. A spring 130 confined at one end by connector 129 forces downwardly on the annular plug 131 to force the plug firmly against the shuttle member 123. The interface between plug 131 and the shuttle member is sealed by O-ring 132 which surrounds the passage $I_D$ through the plug. In a similar manner, spring biased plugs are provided in passages $II'_D$ and $II''_D$.

The shuttle member 123 has three longitudinally spaced, generally radial passages 133, 134 and 135 therethrough. As seen from the drawings, the spacing of passages 133, 134 and 135 is related to passages $I_D$ and $III_D$ such that when passage 133 is adjacent passage $I_D$ passages 134 and 135 are on the left and right, respectively, of passage $III_D$.

As shown in the drawing, the shuttle member 123 is in an intermediate position within bore 121 so that the upstream pressure can flow through conduit 13, passages $I_D$, 133, $II'_D$, $II_D$ and conduit 15 to the piston chamber 23 of the main valve operator to maintain this valve in the open position.

If the downstream pressure decreases, the force in piston chamber 127 will decrease and the spring 67 will force the shuttle member 123 to the left until the shuttle shoulder 124 abuts the bore shoulder 122. At this time the shuttle passage 133 will have moved to the left of O-ring 132 and passage $I_D$ will be sealed against flow therethrough. At the same time shuttle passage 135 will have moved to the left into alignment with passage $II''_D$ so that this passage will vent through passages 135 and $III_D$ to atmosphere, allowing the main valve to close, as previously described. When the downstream pressure returns to normal, the shuttle will be moved back to the illustrated position connecting passages $I_D$ and $II_D$ and disconnecting passages $II_D$ and $III_D$.

If the downstream pressure increases, the force in piston chamber 127 will increase and will overcome the force of spring 67 to move the shuttle 123 to the right until the shuttle shoulder 125 abuts plate 128. Again, communication will be interrupted between passages $I_D$ and $II_D$, whereas passages $II_D$ and $III_D$ will now be connected through shuttle passage 134, enabling the main valve 10 to close. The illustrated position will be returned to when the downstream pressure returns to normal, and the main valve 10 will reopen.

Figure 7:
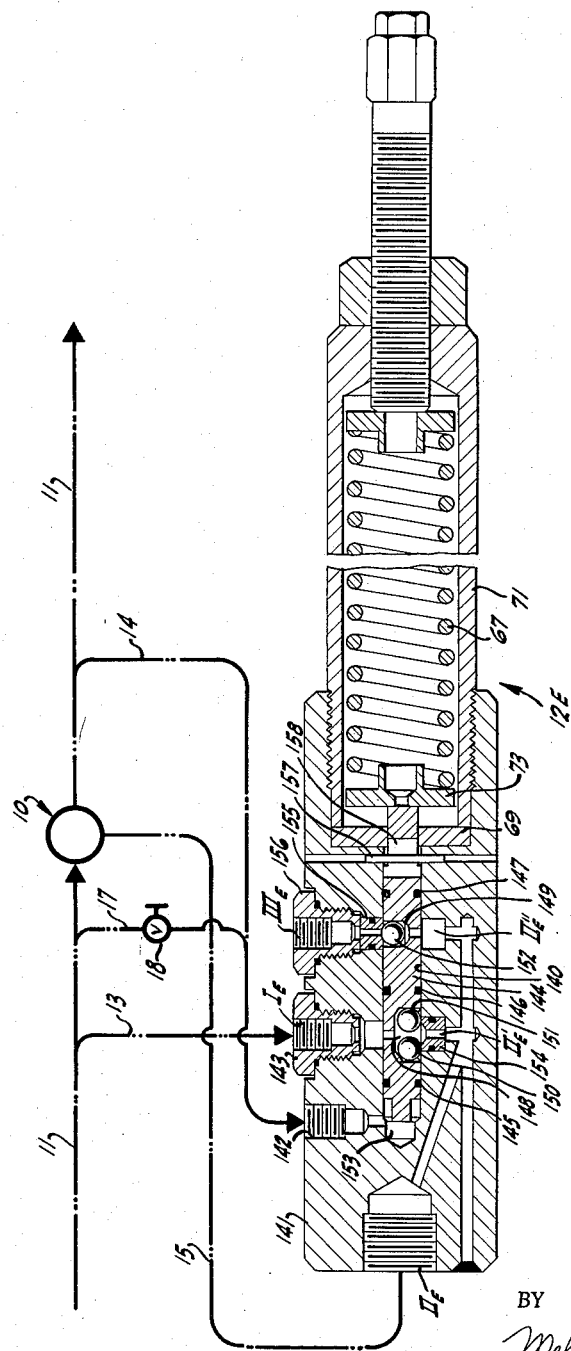
FIG. 7 is similar to FIG. 2 and shows still another modification of the pilot valve.

Referring now to FIG. 7, the pilot valve 12E is designed to control the operation of the main valve 10 in such manner that the main valve will be open whenever the downstream pressure is within a predetermined range and will be closed whenever the downstream pressure is higher or lower than this range.

Pilot valve 12E has a passage $II_E$ formed therein and having first and second portions $II'_E$ and $II''_E$ opening into the bore 140 of the housing member 141 at longitudinal spaced points. Passage $II_E$ connects to the conduit 15 leading to the piston chamber 23 of the main valve 10. Conduits 14 and 13 are connected to port 142 and bushing 143, respectively. Shuttle member 144 is slidably disposed in bore 140 of the housing member 141 and the interface thereof is sealed by O-rings 145, 146 and 147. The shuttle has pockets 148 and 149 in which are disposed balls 150, 151 and 152, and from which the balls cannot be ejected when the shuttle is positioned in the housing bore. Port 142 provides communication between conduit 14 and piston chamber 153. Plug 154 is disposed in the inner enlarged portion of passage $II'_E$, and the interface between it and the housing 141 is sealed by an O-ring. The passageway through plug 154 forms a part of passage $II_E$. The port in which bushing 143 is disposed is diametrically opposite the passage $II'_E$, while the port in which plug 155 and cap 156 are disposed is diametrically opposite the passage $II''_E$. Pin 157 extends through the housing member and through a radial slot 158 in the shuttle to prevent rotation and to limit lateral displacement of the plunger within bore 140. Plate 69, spring stop 73, spring housing 71, spring 67, and their related components are identical to their counterparts shown and described in connection with FIG. 2, and serve the same purpose, which is to force shuttle 144 to the left.

With the various parts of valve 12E in their respective positions as shown in FIG. 7, upstream pressure flows through conduit 13, cap 143, passages $II_E$ and $II'_E$ and conduit 15 into the piston chamber 23 of main valve 10 to maintain the valve in open position. During this time, of course, conduit 15 cannot be vented through passages $II''_E$ and $III_E$, since ball 152 is seated on plug 155 to seal the passageway therethrough.

Should the pressure downstream of main valve 10 exceed a predetermined maximum pressure, the force exerted by it on shuttle 144 will exceed the force exerted thereon by spring 67; shuttle 144 will be forced to the right; ball 150 will seat against plug 154, closing passageway $II'_E$ therethrough, and the passageway through plug 155 will be uncovered as ball 152 moves to the right. When this happens, conduit 15 will be vented through passages $II_E$ and $III_E$ to atmosphere, thus closing main valve 10. Should the downstream pressure decrease below a predetermined minimum pressure, spring 67 in the same manner will force shuttle 144 to the left, causing ball 151 to close passage $II'_E$ and causing ball 152 to move to the left of plug 155. This again opens passage $III_E$ and permits conduit 15 to be vented in the same manner as described above, thus closing main valve 10.

This embodiment of this invention has a distinct advantage in that it is a very compact device and the shuttle 144 need move only a very limited distance to vent the main valve to cause it to close. When the pilot valve is in the position shown in the drawing, upstream pressure can pass through pocket 148, since the balls do not occupy the entire space of the pocket. Hence, it is seen that the shuttle need move only a limited distance to permit one of the balls 150 or 151 to close the passage $II_E$ through plug 154 and to unseat ball 152.

FIG. 8 discloses a pilot valve 12F usable in a fluid flow system generally the same as that depicted in FIG. 1, wherein the pilot valve is used to control the operation of a double acting piston operator for the main flow valve 10A. Since the exact details of the main valve 10A and operator therefor form no part of the instant invention, it has been thought sufficient to illustrate these schematically.

The main valve 10A is of the gate type and has a gate member 161 therein movable transversely relative to the inlet and outlet passages 162 and 163 of the valve. The gate member 161 is moved by stem member 164 having a piston head 165 on the other end thereof which is disposed in piston cylinder 166. The control conduit 15A is connected into the variable capacity piston chamber 167 on one side of the piston head 165 and the control conduit 15B is connected to the variable capacity piston chamber 168 on the other side of the piston head. As will be apparent, if pressure is supplied to piston chamber 167 and chamber 168 is vented to atmosphere, the gate member will be moved to open valve 10A for flow therethrough. Conversely, if chamber 168 is pressurized and chamber 167 is vented to atmosphere, the piston head 165 will be moved to close the gate member.

The pilot valve 12F is designed to control this type of valve in response to the occurrence of a predetermined low downstream pressure. That is, when the downstream pressure is greater than the predetermined amount, the pilot valve will supply upstream pressure to conduit 15A and will vent conduit 15B, to maintain main valve 10A in open position. When the downstream pressure drops, the pilot valve will supply upstream pressure to conduit 15B and will vent conduit 15A to cause the main valve 10A to close.

The pilot valve 12F in essence comprises a pair of pilot valves of the general type described in connection with pilot valve 12A, combined into a single housing member 170 having a single bore 171 therein and a single shuttle member 172 longitudinally slidable in the bore.

A passage $I_{FG}$ is formed through the housing member and opens into bore 171. As will be seen, the upstream pressure entering passage $I_{FG}$ from conduit 13 may flow between the shuttle 172 and the bore 171 to both of the passage portions $II'_F$ and $II'_G$. Ball valves 173 and 174 are carried by shuttle 172 to seat on the plugs 175 and 176 in passages $II'_F$ and $II'_G$, respectively.

Passages $III_F$ and $III_G$ are formed through the housing member and open into the bore 171 opposite to the passage portions $II''_F$ and $II''_G$. Ball valves 177 and 178, carried by shuttle 172, are seatable upon the plugs 179 and 180 in passages $III_F$ and $III_G$, respectively.

Again, a spring housing 71, spring 67, and spring stop 73 are provided to urge shuttle 172 to the left, and plate 69 is provided to limit movement of the shuttle to the right. Similarly, the pressure in piston chamber 66, connected to the downstream conduit 14, acts on the piston head 63 to force the shuttle 172 to the right.

The ball valves are arranged in the shuttle member in such manner that when the shuttle is moved to the right (as illustrated), ball valve 173 will be seated on the plug 175 in passage $II_F$ and ball valve 178 will be seated on the plug 180 in passage $III_G$. Also, ball valves 177 and 174 will be unseated from the plugs 179 and 176 in passages $III_F$ and $III_G$, respectively. Furthermore, when the shuttle has moved to the left, ball valves 173 and 178 will be unseated and ball valves 177 and 174 will be seated.

In the operation of this system, FIG. 8 illustrates the position of the elements when main valve 10A is open and the downstream pressure is above the predetermined minimum. The upstream pressure passes through conduit 13, passages $I_{FG}$ and $II_G$, and conduit 15A to the piston chamber 167. Piston chamber 168 is vented to atmosphere through conduit 15B, and passages $II_F$ and $III_F$.

In the event that the downstream pressure falls below the predetermined minimum (determined by the setting of spring 67), the shuttle 172 will be moved by spring 67 to the left. Ball valve 174 will now seat to prevent upstream pressure from entering passage $II_G$, and ball valve 178 will be unseated to vent passage $II_G$, conduit 15A and piston chamber 167 to atmosphere through passage $III_G$. At the same time, ball valve 177 will seat to close passage $III_F$ and ball valve 173 will be unseated to allow upstream pressure to flow from passage $I_{FG}$ through passage $II_F$ and conduit 15B into piston chamber 168. The presence of pressure in piston chamber 168, and the venting of piston chamber 167 will cause valve 10A to close.

When the downstream pressure again builds up, the shuttle 172 will be moved back to the illustrated position, causing the valve 10A to reopen.

With the same connections as shown, the pilot valve 12F may be used to control the main valve 10A so that the main valve will be closed when the downstream pressure is below a predetermined maximum value and is opened when above that value, by adjusting the spring 67 for the desired maximum value.

The pilot valve 12F can also be used to control the main valve 10 in such manner that the main valve will be open whenever the downstream pressure is below a predetermined maximum and will close whenever the downstream pressure rises above that maximum. In this case the spring 67 is adjusted so as to hold the shuttle 50 to the left until the downtream pressure causes it to move to the right. In addition, the control conduits 15A and 15B are interchanged in their connections to the piston chambers 167 and 168 of valve 10A.

It will be noted that this last arrangement could also be used to control the valve 10A in such manner that it will be closed whenever the downstream pressure is above a predetermined value and will open whenever the downstream pressure falls below that value. Again, the predetermined value is selected by a suitable adjustment of spring 67.

Referring now to FIG. 9, the pilot valves 12H and 12J are used in cooperation with one another in a fluid system to control the operation of main valve 10A therein so as to maintain the main valve in open position when the downstream pressure is above a predetermined amount and to close the main valve when the downstream pressure drops below the predetermined amount.

The pilot valve 12H comprises a first housing member portion 201 surrounding one end of cylinder 202 and fixed thereto by setscrew 203 so as to be integral therewith. Cylinder 202 has a bore 204 therethrough in which is disposed shuttle member 205 for longitudinal sliding movement therein, the shuttle being sealed to the bore by O-ring 206. A passage $I_H$ is formed into one end of the bore 204 through the cap 207, nipple 208 and valve seat member 209, the latter having an O-ring valve seat 210. A ball valve member 211 is disposed freely between the valve seat member and the shuttle. A passage $II'_H$ is formed through the cylinder 202 into the bore 204 at the right, or downstream side, of the valve seat.

The right end of shuttle 205 has an enlarged piston head 212 formed thereon disposed within the chamber 213 formed by the housing member 201, which is vented to atmosphere by port 214.

The right half of pilot valve 12H is an identical mirror image of the left half, and corresponding elements are identified by the same reference numerals with the subscript $a$.

The two housing member portions 201 and 201a are clamped together by bolts 215 with a diaphragm 216 being disposed therebetween.

As is seen, the two bores 204 and 204a form a common bore with a piston chamber 213, 213a being between the extreme ends thereof. The shuttle members 205 and 205a form a common shuttle with a piston head 212, 212a being formed thereon and disposed with the variable capacity piston chamber 213, 213a. The piston head is sealed to the piston chamber by means of the diaphragm 216.

The two valve seats 210 and 210a face one another and are spaced from one another a distance greater than the combined length of the shuttle 205, 205a and ball valves 211 and 211a.

The pilot valve 12J is quite similar to pilot valve 12H, and comprises a first housing member portion 221 surrounding one end of cylinder 222 and fixed thereto by setscrew 223. Cylinder 222 has a bore 224 therethrough in which is disposed shuttle member 225 for longitudinal movement therein, the shuttle being sealed to the bore by O-ring 226.

A passage $I_J$ is formed into one end of the bore 224 through cap 227, and another passage $II'_J$ is formed laterally into bore 224. These passages are in communication through the valve seat member 228, having an O-ring valve seat 229, and the ports 230 through the spring housing 231. The shuttle 225 has an extension 232 thereon of a small enough diameter to pass freely through the valve seat member 228. A ball valve member 233 is disposed at the right end of shuttle extension 232 and is biased thereagainst by spring 234.

The left end of shuttle 225 has an enlarged piston head 235 thereon disposed within the chamber 236 formed by the housing member 221, which is vented to atmosphere by port 237.

The left half of pilot valve 12J is an identical mirror image of the right half just described, and corresponding elements are indicated by the same reference numerals with the subscript $a$.

The two housing member portions 221 and 221a are clamped together by bolts 238 with a diaphragm 239 being disposed therebetween.

As is seen, the two bores 224 and 224a form a common bore with a variable capacity piston chamber 236a being between the extreme ends thereof. The shuttle members 224, 224a form a common shuttle with a piston head 235, 235a being formed thereon and sealed to the piston chamber by diaphragm 239.

The two valve seats 228 and 228a face away from one another and are spaced from one another a distance less than the total length of the shuttles 225, 225a and shuttle extensions 232, 232a thereon.

The pilot valves 12H and 12J are connected into the fluid system as follows. The downstream pressure conduit 14 is connected to the variable capacity piston chamber 213a of pilot valve 12H (through port 214a) and is also connected to the variable capacity piston chamber 236a of pilot valve 12J (through port 237a). The upstream pressure conduit 13 is connected to passages $I_H$ and $I_J$ of valves 12H and 12J, respectively.

The main valve operator control conduit 15A is connected to both passages $II'_J$ and $II''_J$ of pilot valve 12J, and the control conduit 15B is connected to both passages $II'_H$ and $II''_H$ of pilot valve 12H.

In the position of the elements illustrated in FIG. 8, the main valve is open. The downstream pressure is above the predetermined minimum value, and is present in both piston chambers 213a and 236a of valves 12H and 12J, respectively. The pressure in chamber 213a acts against piston 212, 212a and diaphragm 216 to force the shuttle 205, 205a to the left. This seats ball valve 211 on valve seat 210, and allows ball valve 211a to be unseated from valve seat 210a. This position of valves 211 and 211a seals the upstream pressure from conduit 15B and allows the conduit to vent to atmosphere through passages $II''_H$ and $III_H$.

The downstream pressure in chamber 236a of valve 12J acts against piston 235, 235a and diaphragm 239 to force shuttle 225, 225a to the right. This unseats ball valve 233 from valve seat 229, and allows spring 234a to seat valve 233a against valve seat 229a. This position of the ball valves allows upstream pressure from conduit 13 to pass through passages $I_J$ and $II'_J$ to conduit 15A and thus to piston chamber 167 of main valve 10A. Conduit 15A is prevented from venting to atmosphere through passages $II''_J$ and $III_J$ because of the seating of valve 233a on valve seat 229a.

Should the downstream pressure be decreased to a predetermined level (determined by the relative areas of diaphragm 216 and ball valve 211 acted upon by the downstream and upstream pressures, respectively) upstream pressure on ball 211 will force the ball and shuttle 205 to the right, also forcing shuttle 205a and ball 211a to the right to seat ball valve 211a on valve seat 210a.

The upstream pressure can now flow through passages $I_H$ and $II'_H$ to control conduit 15B to piston chamber 168 of main valve 10A. Valve 211a, being seated on valve seat 210a, prevents control conduit 15B from venting to atmosphere.

At the same time, the decrease of downstream pressure in chamber 236a of pilot valve 12J will allow the upstream pressure on the shuttle 225 to move the shuttle to the left, permitting spring 234 to seat ball valve 233 on valve seat 229. This movement of shuttle 225 causes shuttle 225a to unseat ball valve 233a from valve seat 229a. Such movement then seals the upstream pressure from the control conduit 15A which vents to atmosphere through passages $II''_J$ and $III_J$.

The combined pressurizing of piston chamber 168 and venting of chamber 167 of the main valve operator allows the main valve 10A to close.

When the downstream pressure increases again, the pressure in chamber 213a will increase to force the shuttle back to the left, seating ball valve 211 and unseating ball valve 211a, again venting the main valve piston chamber 168 to atmosphere.

At the same time, the pressure within chamber 237a and the force of spring 234a are greater than the force exerted by spring 234. This causes ball valve 233a to seat and ball valve 233 to be unseated, thus permitting upstream pressure to flow through passages I_J and II'_J to the control conduit 15A to reopen the main valve 10A.

Again, as in the last described flow system, the control conduits 15A and 15B could be reversed so that the main valve 10A could be operated to be open when the downstream pressure is below a predetermined maximum and to close when the pressure rises above that value.

It will also be apparent that the valve 12H could be used alone as a replacement for the valve 12A in the system desribed in FIG. 2 and would control the main valve 10 in the same manner that it is controlled by pilot valve 12A.

Although only a few modifications of the illustrated control systems have been suggested, it is apparent that other combinations of the pilot valves 12A, 12B, 12C, 12D, 12E, 12F, 12H and 12J can be made to control the main valves 10 or 10A in such manner that the control of the main valve be accomplished by the pilot valves in response to changes in the downstream pressure. In each case, upstream pressure is applied through the pilot valves to the valve operator of the main valves. It is also apparent that the downstream pressure actuated piston of the pilot valves could be supplied by conduits from an external pressure source so as to be controlled by variations in that pressure. Other such modifications will be apparent to one skilled in the art.

It is thus to be realized that the forms of the invention herewith shown and described are to be taken as preferred embodiments of the same, and that various changes in the shape, size and arrangement of parts may be resorted to without departing from the spirit of the invention or the scope of the attached claims.

Having thus described my invention, what I claim and desired to secure by Letters Patent is:

1. A pilot valve comprising a housing member having a bore therethrough, a shuttle member disposed within said bore for longitudinal movement therein, means forming a piston chamber within said housing member, a piston head axially formed on said shuttle and projecting into said piston chamber, means including a spring for biasing said shuttle relative to said housing with a predetermined force in a direction to move said shuttle within said bore to move said piston head into said piston chamber, means forming a first passage through said housing member laterally into said bore, means forming a second passage through said housing member, said second passage having a first opening laterally into said bore in proximity to said first passage, said first opening having a valve seat facing into said bore, said second passage having a second opening laterally into said bore longitudinally spaced from said first opening, means forming a third passage through said housing member laterally into said bore in proximity to the second opening of said second passage, said third passage opening having a valve seat facing into said bore, said shuttle being provided with two longitudinally spaced, ball valve receiving pockets formed laterally thereinto, said shuttle having passageways interconnecting one of said pockets with said first passage and the first opening of said second passage and having passageways interconnecting the other of said pockets with the second opening of said second passage and said third passage, a ball valve member freely disposed within each of said pockets and movable laterally therein, each of said ball valve members being seatable upon a valve seat when laterally aligned therewith, the ball valve members being longitudinally spaced from one another a distance different from the longitudinal spacing of said valve seats, said shuttle being longitudinally movable within said bore by the relative forces of the pressure within said piston chamber and said biasing means between a first position wherein one of said ball valve members is laterally aligned with one of said valve seats and a second position wherein the other of said ball valve members is laterally aligned with the other of said valve seats, and means for sealing said shuttle to said bore between said valve seats.

2. A pilot valve comprising a housing member having a bore therethrough, a shuttle member disposed within said bore for longitudinal movement therein, means forming a piston chamber within said housing member, a piston head axially formed on said shuttle and projecting into said piston chamber, means for biasing said shuttle relative to said housing with a predetermined force in a direction to move said shuttle within said bore to move said piston head into said piston chamber, means forming a first passage through said housing member into said bore, means forming a second passage through said housing member, said second passage having a first opening into said bore in proximity to said first passage, said first opening having a valve seat facing into said bore, said second passage having a second opening into said bore longitudinally spaced from said first opening, means forming a third passage through said housing member into said bore in proximity to the second opening of said second passage, said third passage opening having a valve seat facing into said bore, said shuttle being provided with two longitudinally spaced, valve receiving pockets formed thereinto, said shuttle having passageways interconnecting one of said pockets with said first passage and the first opening of said second passage and having passageways interconnecting the other of said pockets with the second opening of said second passage and said third passage, a valve member disposed within each of said pockets, said valve members being seatable upon said valve seats when adjacent therewith, the valve members being longitudinally spaced from one another a distance different from the longitudinal spacing of said valve seats, interengageable stop means on said housing member and said shuttle for limiting longitudinal movement of said shuttle within said bore when the force within said piston chamber exerted upon said piston head is less than the force of said predetermined bias to a position wherein one of said valve members is adjacent to one of said valve seats and for limiting opposite longitudinal movement of said shuttle within said bore when the force within said piston chamber exerted upon said piston head is greater than the force of said predetermined bias to a position wherein the other of said valve members is adjacent to the other of said valve seats, and means for sealing said shuttle to said bore between said valve seats.

3. A pilot valve comprising a housing having a bore therethrough, a shuttle member disposed within said bore for longitudinal movement therein, means forming a piston chamber within said housing member, a piston head axially formed on said shuttle and projecting into said piston chamber, means for biasing said shuttle relative to said housing with a predetermined force in a direction to move said shuttle within said bore to move said piston head into said piston chamber, means forming a first passage through said housing member laterally into said bore, means forming a second passage through said housing member, said second passage having a first opening laterally into said bore in proximity to said first passage, said first opening having a valve seat facing into said bore, said second passage having a second opening laterally into said bore longitudinally spaced from said first opening, means forming a third passage through said housing member laterally into said bore in proximity to the second opening of said second passage, said third passage opening having a valve seat facing into said bore, said shuttle being provided with two longitudinally spaced, ball valve receiving pockets formed laterally thereinto, said shuttle having passageways interconnecting one of said pockets with said first passage and the first opening of said second passage and having passageways interconnecting the other of said pockets with the second opening of said second passage and said third passage, a ball valve member disposed within each of said pockets and movable laterally therein, said ball valve members being seatable upon said valve seats when laterally aligned therewith, the ball valve members being longitudinally spaced from one another a distance less than the longitudinal spacing of said valve seats, interengageable stop means on said housing member and said shuttle for limiting longitudinal movement of said shuttle within said bore when the force within said piston chamber exerted upon said piston head is less than the force of said predetermined bias to a position wherein one of said ball valve members is laterally aligned with the valve seat in said second passage and for limiting opposite longitudinal movement of said shuttle within said bore when the force within said piston chamber exerted upon said piston head is greater than the force of said predetermined bias to a position wherein the other of said ball valve members is laterally aligned with the valve seat in said third passage, and means for sealing said shuttle to said bore in between said valve seats.

4. A pilot valve comprising a housing member having a bore therethrough, a shuttle member disposed within said bore for longitudinal movement therein, means for moving said shuttle longitudinally within said bore between first and second positions, means forming a first passage through said housing member laterally into said bore, means forming a second passage through said housing member, said second passage having a first opening laterally into said bore in proximity to said first passage, said first opening having a valve seat facing into said bore, said second passage having a second opening laterally into said bore longitudinally spaced from said first opening, means forming a third passage through said housing member laterally into said bore in proximity to the second opening of said second passage, said third passage opening having a valve seat into said bore, said shuttles being provided with two longitudinally spaced valve receiving pockets formed laterally thereinto, said shuttle having passageways interconnecting one of said pockets with said first passage and the first opening of said second passage and having passageways interconnecting the other of said pockets with the second opening of said second passage and said third passage, and a valve member disposed within each of said pockets and movable laterally therein, said valve members being seatable upon said valve seats when laterally aligned therewith, the valve members being longitudinally spaced from one another a distance different from the longitudinal spacing of said valve seats, one of said valve members being laterally aligned with one of said valve seats when said shuttle is in its first position, and the other of said valve members being laterally aligned with the other of said valve seats when said shuttle is in its second position, and means for sealing said shuttle to said bore in between said valve seats.

5. A pilot valve comprising a housing member having a bore therethrough, a shuttle member disposed within said bore for longitudinal movement therein, means forming a piston chamber within said housing member, a piston head axiallly formed on said shuttle and projecting into said piston chamber whereby pressure within said piston chamber will urge said shuttle member to move longitudinally in one direction within said bore, spring means for biasing said shuttle for movement in said bore in a direction opposite to said one direction, means forming a first passage through said housing member into said bore, means forming a second passage through said housing member, said second passage having a first opening into said bore in proximity to said first passage, said first opening forming a valve seat facting into said bore, said second passage having a second opening into said bore longitudinally spaced from said first opening, means forming a third passage through said housing member into said bore in proximity to the second opening of said second passage, said third passage opening forming a valve seat facing into said bore, said shuttle being provided with two longitudinally spaced apart, valve receiving pockets formed laterally thereinto, said shuttle having passageways interconnecting one of said pockets with said first passage and the first opening of said second passage and having passageways interconnecting the other of said pockets with the second opening of said second passage and said third passage, a single valve member disposed within one of said pockets and freely movable therein, a pair of valve members disposed within the other of said pockets, each of said pair of valve members being freely movable therein, said valve members each being seatable upon a valve seat when adjacent thereto, the longitudinal distance between said valve seats being equal to the longitudinal distance from said single valve member to between said pair of valve members, and means for sealing said shuttle to said bore between said valve seats.

6. A pilot valve comprising a housing member having a bore therethrough, a shuttle member disposed within said bore for longitudinal movement therein, means forming a piston chamber within said housing member, a piston head axially formed on said shuttle and projecting into said piston chamber whereby pressure within said piston chamber will urge said shuttle member to move longitudinally in one direction within said bore, spring means for biasing said shuttle for movement in said bore in a direction opposite to said one direction, means forming first, second and third passages through said housing member laterally into said bore, said second passage having a first opening laterally into said bore in proximity to said first passage and forming a valve seat facing into said bore, said second passage having a second opening laterally into said bore longitudinally spaced from said first opening, said third passage opening laterally into said bore in proximity to the second opening of said second passage and having a valve seat facing into said bore, said shuttle being provided with two longitudinally spaced apart, ball valve receiving pockets formed laterally thereinto, said shuttle having passageways interconnecting one of said pockets with said first passage and the first opening of said second passage and having passageways interconnecting the other of said pockets with the second opening of said second passage and said third passage, a single ball valve member disposed within one of said pockets and movable laterally therein, and a pair of ball valve members disposed within the other of said pockets, each ball valve member being laterally movable therein, said ball valve members each being seatable upon a valve seat when laterally aligned therewith, the longitudinal distance between said valve seats being equal to the longitudinal distance from said single ball valve member to between said pair of ball valve members.

7. A pilot valve comprising a housing member having a bore therethrough, a shuttle member disposed within said bore for longitudinal movement therein, means forming a piston chamber within said housing member, a piston head axially formed on said shuttle and projecting into said piston chamber whereby pressure within said piston chamber will urge said shuttle member to move longitudinally in one direction within said bore, spring means for biasing said shuttle for movement in said bore in a direction opposite said one direction, means forming first, second and third passages through said housing member laterally into said bore, said second passage having a first opening laterally into said bore in proximity to said first passage, said first opening forming a valve seat facing into said bore, said second passage having a second opening laterally into said bore longitudinally spaced from said first opening, said third passage opening laterally into said bore in proximity to the second opening of said second passage and having a valve seat facing into said bore, said shuttle being provided with two longitudinally spaced apart, ball valve receiving pockets formed laterally thereinto, said shuttle having passageways interconnecting one of said pockets with said first passage and the first opening of said second passage and having passageways interconnecting the other of said pockets with the second opening of said second passage and said third passage, a single ball valve member disposed within one of said pockets and movable laterally therein, a pair of ball valve members disposed within the other of said pockets, each of said pairs of ball valve members being laterally movable therein, said ball valve members each being seatable upon a valve seat when laterally aligned therewith, the longitudinal distance between said valve seats being equal to the longitudinal distance from said single ball valve member to between said pair of ball valve members, said shuttle being movable longitudinally within said bore by the relative forces of the pressure exerted within said piston chamber and the biasing means between first and second extreme positions, said shuttle also having a third position within said bore in between said first and second positions, said shuttle when in said first position having one of said pair of ball valve members aligned with one of said valve seats, said shuttle when in its second position having the other of said pair of ball valve members aligned with said one valve seat, said shuttle when in its third position having said single ball valve member aligned with the other of said valve seats, and means for sealing said shuttle to said bore between said valve seats.

8. A pilot valve comprising a housing member having a bore therethrough, a shuttle member disposed within said bore for longitudinal movement therein, means forming a piston chamber within said housing member, a piston head axially formed on said shuttle and projecting into said piston chamber whereby pressure within said piston chamber will urge said shuttle member to move longitudinally in one direction within said bore, spring means for biasing said shuttle for movement in said bore in a direction opposite to said one direction, means forming first, second and third passages through said housing member into said bore, said second passage having first and second longitudinally separated openings into said bore, said first opening having a valve seat facing into said bore in proximity to said first passage, said third passage having its opening into said bore in proximity to the second opening of said second passage and having a valve seat facing into said bore, said shuttle being provided with a first pair of longitudinally spaced apart, valve receiving pockets formed thereinto, said shuttle having pasageways interconnecting one of said first pair of pockets with said first passage and the first opening of said second passage and having passageways interconnecting the other of said first pair of pockets with the second opening of said second passage and said third passage, a first set of valve members disposed one within each of said pockets and freely movable therein, said valve members each being seatable upon a valve seat when adjacent thereto, the valve members being longitudinally spaced from one another a distance different from the longitudinal spacing of said valve seats, means forming fourth, fifth and sixth passages through said housing member into said bore, said fifth passage having first and second longitudinally separated openings into said bore, said first opening of said fifth passage having a valve seat facing into said bore in proximity to said fourth passage, said sixth passage having its opening into said bore in proximity to the second opening of said fifth passage and having a valve seat facing into said bore, said shuttle being provided with a second pair of longitudinally spaced apart, valve receiving pockets formed thereinto, said shuttle having passageways interconnecting one of said second pair of pockets with said fourth passage and the first opening of said fifth passage and having passageways interconnecting the other of said second pair of pockets with the second opening of said fifth passage and said sixth passage, a second set of valve members disposed one within each of said second pair of pockets and freely movable therein, each of said second set of valve members being seatable upon one of said second set of valve seats when adjacent thereto, the second set of valve members being longitudinally spaced from one another a distance different from the longitudinal spacing of said second set of valve seats, said shuttle being movable between first and second positions by the relative forces imposed thereon by the pressure in said piston chamber and said biasing means between a first position wherein one of each set of said ball valve members is adjacent to one of the first named valve seats and one of the last named valve seats respectively and a second position wherein the other of each set of said ball valve members is adjacent to the others of said valve seats, means for sealing said shuttle to said bore in between the valve seats in each pair thereof.

9. A pilot valve comprising a housing member having a bore therethrough, a shuttle member disposed within said bore for longitudinal movement therein, means forming a piston chamber within said housing member, a piston head axially formed on said shuttle and projecting into said piston chamber whereby pressure within said piston chamber will urge said shuttle member to move longitudinally in one direction within said bore, spring means for biasing said shuttle for movement in said bore in a direction opposite to said one direction, means forming first, second and third passages through said housing member laterally into said bore, said second passage having first and second longitudinally separated openings laterally into said bore, said first opening having a valve seat facing into said bore in proximity to said first passage, said third passage having its opening into said bore in proximity to the second opening of said second passage and having a valve seat facing into said bore, said shuttle being provided with a first pair of longitudinally spaced apart, ball valve receiving pockets formed laterally thereinto, said shuttle having passageways interconnecting one of said first pair of pockets with said first pasage and the first opening of said second passage and having passageways interconnecting the other of said first pair of pockets with the second opening of said second passage and said third passage, a first set of ball valve members disposed one within each of said pockets and movable laterally therein, said ball valve members being each seatable upon a valve seat when laterally aligned therewith, the ball valve members being longitudinally spaced from one another a distance different from the longitudinal spacing of said valve seats, means forming fourth, fifth and sixth passages through said housing member laterally into said bore, said fifth passage having first and second longitudinally separated openings laterally into said bore, said first opening of said fifth passage having a valve seat facing into said bore in proximity to said fourth passage, said sixth passage having its opening into said bore in proximity to the second opening of said fifth passage and having a valve seat facing into said bore, said shuttle being provided with a second pair of longitudinally spaced apart, ball valve receiving pockets formed laterally thereinto, said shuttle having passageways interconnecting one of said second pair of pockets with said fourth passage and the first opening of said fifth passage and having passageways interconnecting the other of said second pair of pockets with the second opening of said fifth passage and said sixth passage, a second set of ball valve members disposed one within each of said second pair of pockets and movable laterally therein, said second set of ball valve members being each seatable upon one of said second set of valve seats when laterally aligned therewith, the second set of ball valve members being longitudinally spaced from one another a distance different from the longitudinal spacing of said second pair of valve seats, interengageable stop means on said housing member and said shuttle for limiting longitudinal movement of said shuttle within said bore when the force within said piston chamber exerted upon said piston head is less than the force of said predetermined bias to a position wherein one of each set of said ball valve members is laterally aligned with one of each of said pairs of valve seats and for limiting opposite longitudinal movement of said shuttle within said bore when the force within said piston chamber exerted upon said piston head is greater than the force of said predetermined bias to a position wherein the other of each set of said ball valve members is laterally aligned with the others of said valve seats, means for sealing said shuttle to said bore in between said valve seats of said pairs thereof.

References Cited in the file of this patent
UNITED STATES PATENTS

| | | |
|---|---|---|
| 1,843,953 | McKinney | Feb. 9, 1932 |
| 1,918,891 | Barrett | July 18, 1933 |
| 2,679,261 | Otis | May 25, 1954 |
| 2,754,843 | Hauber | July 17, 1956 |